United States Patent [19]
Kellner

[11] Patent Number: 5,721,611
[45] Date of Patent: Feb. 24, 1998

[54] PHOTOGRAMMETRIC CAMERA, IN PARTICULAR FOR PHOTOGRAMMETRIC MEASUREMENTS OF TECHNICAL OBJECTS

[75] Inventor: Helmut Kellner, Moormerland, Germany

[73] Assignee: E.M.S. Technik, GmbH, Leer, Germany

[21] Appl. No.: 505,209

[22] PCT Filed: Feb. 15, 1994

[86] PCT No.: PCT/DE94/00181

§ 371 Date: Sep. 6, 1995

§ 102(e) Date: Sep. 6, 1995

[87] PCT Pub. No.: WO94/18524

PCT Pub. Date: Aug. 18, 1994

[30] Foreign Application Priority Data

Feb. 15, 1993 [DE] Germany .................. 43 04 529.4

[51] Int. Cl.⁶ .................. G01C 3/00; G01B 11/14; G03B 13/00

[52] U.S. Cl. .................. 356/3.16; 356/375; 348/357; 348/374

[58] Field of Search .................. 348/357, 374; 356/373, 375, 3.16

[56] References Cited

U.S. PATENT DOCUMENTS

| | | | |
|---|---|---|---|
| 5,196,400 | 3/1993 | Petterson | 356/141 |
| 5,404,226 | 4/1995 | Kellner | 358/373 |
| 5,435,785 | 7/1995 | Lenhardt et al. | 348/357 |
| 5,453,839 | 9/1995 | Samuelsson | 356/375 |

FOREIGN PATENT DOCUMENTS

| | | |
|---|---|---|
| 0 504 037 | 9/1992 | European Pat. Off. . |
| 0 512 403 | 11/1992 | European Pat. Off. . |
| 35 37 220 | 4/1987 | Germany . |
| 39 09 855 | 9/1990 | Germany . |

*Primary Examiner*—Mark Hellner
*Attorney, Agent, or Firm*—Burns, Doane, Swecker & Mathis, L.L.P.

[57] ABSTRACT

A photogrammetric camera, in particular for photogrammetric measurements of technical objects, has a primary lens system (10) designed as a focussable objective and a combination of at least one high-resolution sensor (12, 14, 16) and a lens unit (18, 20, 22) which acts as a secondary lens system for producing an enlarged section of the focal plane of the primary objective on the high-resolution sensor. The secondary objective and the high-resolution sensor are movable across the optical axis (26) of the primary objective. High-resolution distance measurement devices (28, 30) which detect the distance between the projection center of the secondary objective and a reference point of the high-resolution sensor on the one hand and the optical axis of the primary objective on the other hand are associated to the secondary objective and to the high-resolution sensor.

22 Claims, 5 Drawing Sheets

PHOTOGRAMMETRIC CAMERA, IN PARTICULAR FOR PHOTOGRAMMETRIC MEASUREMENTS OF TECHNICAL OBJECTS

The invention relates to a photogrammetric camera, in particular for photogrammetric measurements of technical objects using a focussable objective and at least one high resolution sensor movable across an optical axis, and a distance measurement device.

BACKGROUND OF THE INVENTION

Photogrammetric cameras of this kind are known for photogrammetric measurements of terrestrial objects from the ground or from the air. Generally, light-sensitive film on a photochemical base is used as the photographic receiver. The typical film format amounts to 23*23 cm or 13*18 cm and the resolution a maximum of 50 lines/mm for black and white aerial survey films.

To be able to measure objects which lie far apart with consideration of the resolution power, several overlapping exposures must be made which are assembled into a complete picture with the aid of control points. Before the final image is available for measurement and analysis, the exposed film must be developed, rectified if necessary, and the partial images must be assembled at the control points.

For the measurement of technical objects, i.e., for processing information through tooling machines, this expenditure and the time span between the exposure and the possibility of evaluating the pictures is uneconomical and unsatisfactory.

When optoelectric sensors, the image information of which is stored in memory, are used as a photographic receiver instead of a photochemical film, the time expenditure for the development of the film material drops away, but an immense storage capacity is required for this to store the image information, which in turn requires a significant image processing time for computer processing the image information as a result. In this way, the optoelectric substitution of the known photochemical photographic receiver does not offer an economic alternative either.

For achieving technical objects, it is a matter of the image information lying in sections of the complete picture, while the image information lying in the remaining sections is extraneous.

A photogrammetric camera which includes a focussable objective and a sensor is known from EP 0 505 037 A2. A distance measuring arrangement makes the measurement of the distance between the objective and the sensor possible. The sensor is designed as a horizontal CCD line and is arranged on a platform which is movable across the optical axis of the objective in the vertical direction so that a two-dimensional image can be scanned by moving the CCD line.

Furthermore, an optoelectric camera in which the image is broken into partial images by lenses is known from DE 35 37 220 A1. An image projected from a first objective to a focal plane is reproduced by further lenses on a 1:1 scale on the surfaces of the CCD surface sensors. In this way, standard small surface sensors can be used for obtaining a large image.

Finally, a position indicator for determining the position of a sampling device relative to a surface that can be positioned is known from DE 39 09 855 C2. For this, marks at a constant interval which are arranged in two coordinate directions on a positionable surface are evaluated by means of samplers, from which all three coordinate directions of a Cartesian coordinate system can be determined.

SUMMARY OF THE INVENTION

The invention provides a photogrammetric camera including a focussable primary lens system having a focal plane, a high resolution sensor unit which is movable across an optical axis of the primary lens system, and a distance measuring unit including at least one high resolution distance measurement device which detects the distance between at least one projection center of the secondary lens system and a reference point of the at least one high resolution sensor, and the distance between the projection center and the optical axis of the primary lens system. The high resolution sensor unit includes a secondary lens system which reproduces at least one enlarged section of the focal plane of the primary lens system on at least one high resolution sensor allocated to the secondary lens unit.

The photogrammetric camera in accordance with the invention makes possible an enlarged reproduction of the object on the sensor for lower structure depths over the combination sensor with the secondary lens system. Since for this only a section of the focal plane of the primary lens system is reproduced on the sensor, the sensor and the secondary lens system are movable across the optical axis of the primary lens system, so that each desired area of the focal plane of the primary lens system can be captured in series.

In the total evaluation, the distance between the individual sections, which were reproduced on the sensor and determined by high-resolution distance measurement devices, is included. The precision that can be achieved with this is higher than when the distances must be determined in a typical manner through overlapping intermediate images, which must be assembled at control points. Each control point adjustment leads namely to mistakes which accumulate with numerous intermediate images.

Through this photogrammetric camera the image information to be processed is significantly reduced, since only the information that lies in the relevant sections must be processed. The image information which lies outside of these sections, which must be processed in known photogrammetric cameras exclusively for this purpose to determine the relative position of the objects under consideration, remains out of consideration. The distance information delivered from the distance measuring devices which incorporates a very low volume of data takes its place.

For the evaluation of the image information standard microcomputers are suitable which make the desired measurement result available immediately after capturing the image and thus make an economical use of the photogrammetric camera for photogrammetric measurements of technical objects possible.

A furtherance of the invention provides that several high-resolution sensors are arranged in a matrix with these associated secondary lens systems which has constant column distances and constant row distances.

Thus only one partial area of the focal plane of the primary lens system is allocated to each sensor. The maximum required shifting movement of the secondary lens system and the sensors for capturing the objects reproduced on the focal plane of the primary lens system as desired are thus smaller. This reduces the width and the length dimensions of the photogrammetric camera at once and reduces the exposure time as well.

The secondary lens systems can comprise several cascaded individual lens systems.

This design allows the depth dimension of the photogrammetric camera to be reduced further while maintaining a desired magnification factor of the image on the sensor or to obtain a higher magnification factor of the image on the sensor for the same depth dimensions. A higher magnification factor could also be obtained through a secondary lens system constructed as a single lens system with smaller focal length, but this has the disadvantage that blurred edges result.

In a first design, the high-resolution sensors and the secondary lens systems are arranged on a common slide and are movable together.

This design, besides having a mechanically simpler construction, has the advantage that only one common distance measuring device is required for each combination of sensor and secondary lens system.

For a second design, the high-resolution sensors and the secondary lens systems are arranged on separate slides and are movable independently from one another.

Here the expenditure is higher from a mechanical point of view and due to the additional distance measuring device, but economic designs with smaller pixel or picture point quantity rather than broad angle designs can be used as sensors.

The high-resolution sensors can be designed as CCD lines or as CCD surfaces.

The use of CCD lines is particularly interesting from an economic aspect, since CCD lines are made in large quantities for use in handy scanners and telefax devices and can be obtained particularly economically. Since the CCD lines must be shifted for an exposure, the exposure time is increased, however. The imaging precision of the object during the shifting is not impaired, since the shifting path is acquired precisely by the high-resolution distance measurement device which is present anyway.

In contrast to this, the use of sensors designed as CCD surfaces makes a short exposure time possible. CCD surfaces are considerably more expensive than CCD lines, however.

A furtherance provides that high-resolution spacial position measurement devices are allocated to the primary lens system. For this the spacial position measurement devices are formed from at least three, preferably four high-resolution distance measuring devices arranged evenly on a mantle surface lying coaxially to the optical axis of the primary lens system.

These spacial position measurement devices serve to capture the positional changes of the primary lens system with focussing movements and account for these in the measurement results. For this the position of the optical axis has a particular meaning, since the distance measurements of the secondary lens systems and the sensors refer to the optical axis of the primary lens system. If the primary lens system is tipped due to the imprecision of the guiding means, then the optical axis also makes an excursion. The distance measurement value referenced to a desired position of the optical axis can then be corrected by the determined measure of the excursion.

Preferably, the high-resolution distance measurement devices are designed as position indicators for determining the position of a sampling arrangement relative to a positionable surface with positionable surfaces on the secondary lens systems, the high-resolution sensors and the primary lens system and sampling arrangements on the common housing or the reverse. For this, marks of a constant interval are arranged on the positionable surface in two coordinate directions and these marks stand opposite the samplers, whereby the samplers are connected with a coordinates processor and whereby the samplers each include an angle measurement device by means of which the projection angle between a reference point of the angle measurement device of the sampler in each case and at least three adjacently arranged marks are determined. The computer is controlled so that the coordinates of the reference point in each case are calculated according to trigonometric functions.

With the position indicator used, which is described in detail in DE-PS 30 09 855, the absolute position of the entire positionable surface can be determined immediately and even with the same precision in both coordinate directions. An interpolation between the marks made for fine definition makes it possible that the density of the marks required for a desired resolution in a coordinate direction can be reduced. The calculation delivers the distance between the positionable surface and the reference point for this as well, which can be indicated as a third coordinate which stands perpendicular to both coordinates lying in the positionable surface.

The computer can process the following functions or equations as trigonometric functions for this:

$$X_o; Y_o = \frac{\Delta * (Z_1^2 - Z_2^2)}{(Z_1 - Z_2)^2 + \Delta^2}$$

$$Z_o = \frac{\Delta^2 * (Z_1 - Z_2)}{(Z_1 - Z_2)^2 + \Delta^2}$$

whereby $$Z_1 + \frac{\Delta}{2 * \tan\alpha}$$

whereby $$Z_2 = \frac{\Delta}{2 * \tan\beta}$$

where α refers to the projection angle between an associated reference point as well as a first and a second adjacent mark, β refers to the projection angle between the associated reference point and a second as well as a third adjacent mark, Δ is the distance between two adjacent marks and $X_0$, $Y_0$, Z0 represent the coordinates of the associated reference points relative to the positionable surface.

The calculations can be conducted quickly and precisely with standard computers so that actualized measurement values are present with practically no measurement delay after shifting.

Additional and advantageous embodiments of the invention are given by the claims, the further description and the drawings.

In the following an exemplary embodiment of the invention is explained with the help of the drawings.

DETAILED DESCRIPTION OF THE PREFERRED EMBODIMENT

Figure 1:
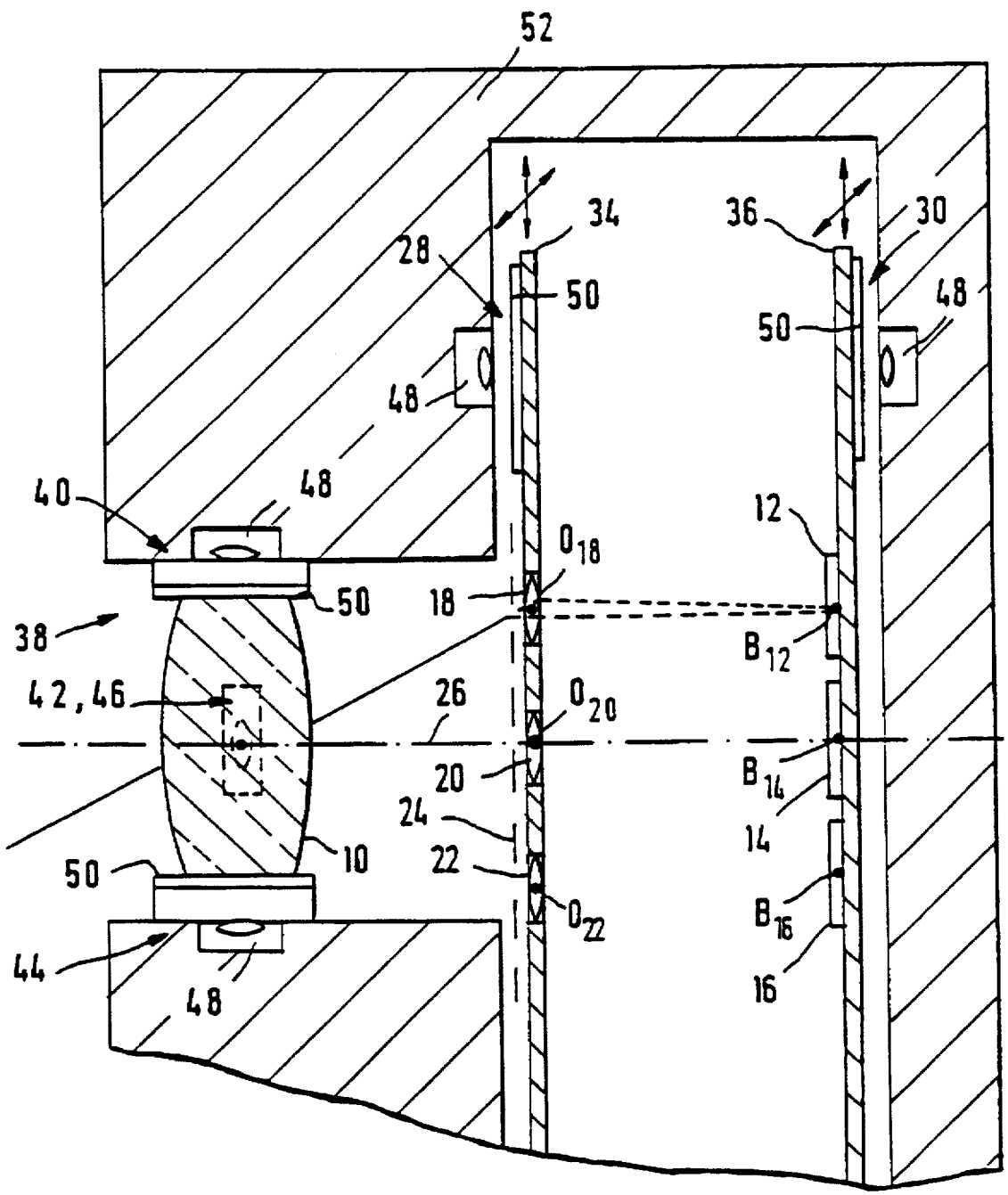
FIG. 1 shows a longitudinal cut through a photogrammetric camera in a first embodiment.

FIG. 1 is a longitudinal cut-away view through a photogrammetric camera in a first embodiment. It includes a focussable primary lens system 10, which reproduces an object on a focal plane 24. In contrast to the typical photogrammetric cameras for photogrammetric measurements, there is no sensor in the focal plane itself. Rather, a combination of several high-resolution sensors 12, 14, 16 and secondary lens systems 18, 20, 22 allocated to these is arranged behind the focal plane 24. Each secondary lens system 18, 20, 22 reproduces an enlarged section of the focal plane 24 of the primary lens system 10 on the associated high-resolution sensor 12, 14, 16.

The secondary lens systems 18, 20, 22 and sensors 12, 14, 16 are fixed on the focal plane 24. Thus the primary lens system 10 must be changed to adapt to the distance of the object to be imaged.

So that the sensors 12, 14, 16 can capture each desired section of the focal plane 24 of the primary lens system 10, they and the secondary lens systems 18, 20, 22 are arranged movably across the optical axis 26 of the primary lens system 10 on slides 34 and 36. The slides 34 and 36 make a two-axis shift possible. Besides the depicted variation with two independently movable slides 34 and 36, it is also possible to couple the slides or to provide only one common slide 34. The shifting movements are undertaken by drivers which are not depicted here or else manually. CCD fines as well as CCD surfaces can be used as sensors 12, 14, 16.

Distance measurement devices 28, 30 which are allocated to the high-resolution sensors 12, 14, 16 and the secondary lens systems 18, 20, 22 serve to determine the shifting movements. These distance measurement devices 28, 30 measure the distance in two dimensions between the projection centers $O_{18}$, $O_{20}$, $O_{22}$ of the secondary lens systems 18, 20, 22 and reference points $B_{12}$, $B_{14}$, $B_{16}$ of the high-resolution sensors 12, 14, 16 on one hand and the optical axis 26 of the primary lens system 10 on the other hand.

Spacial position measurement devices 38 which serve in particular for determining the position and slope of the optical axis of the primary lens system 10 are allocated to the primary lens system 10. These spacial position measurement devices 38 comprise four high-resolution distance measurement devices 40, 42, 44, 46 arranged evenly on a mantle surface lying coaxially to the optical axis 26 of the primary lens system 10. The distance measurement premeasurement devices 28, 30 for the high-resolution sensors 12, 14, 16 and the secondary lens systems 18, 20, 22 as well as the distance measurement devices 40, 42, 44, 46 for the spacial position measurement devices 38 of the primary lens system 10 are designed as position indicators for determining the position of a sampling arrangement 48 relative to a positionable surface 50.

For this, the positionable surfaces 50 of the position indicators on the secondary lens systems 18, 20, 22, the high-resolution sensors 12, 14, 16 or their slides 34, 36 and the primary lens system 10 and the sampling arrangements 48 are attached on a common housing 52. A reverse arrangement is also possible. The housing 52 and the positionable surfaces 50 comprise a material with a low temperature expansion coefficient, preferably made of invar or zerodur.

Figure 2:
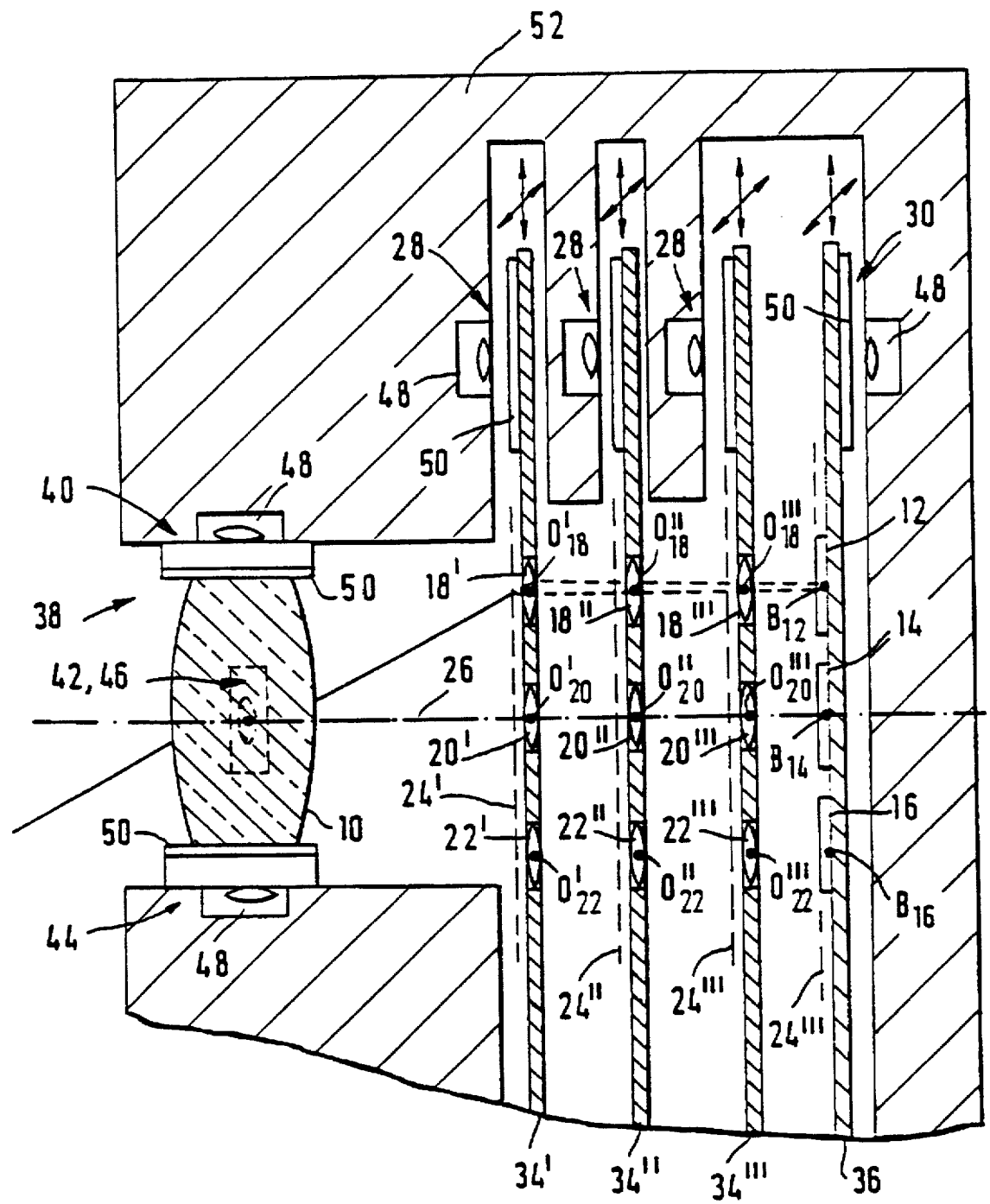
FIG. 2 shows a longitudinal cut through a photogrammetric camera in a second embodiment with secondary lens systems designed as cascaded individual lens systems.
Figure 3:
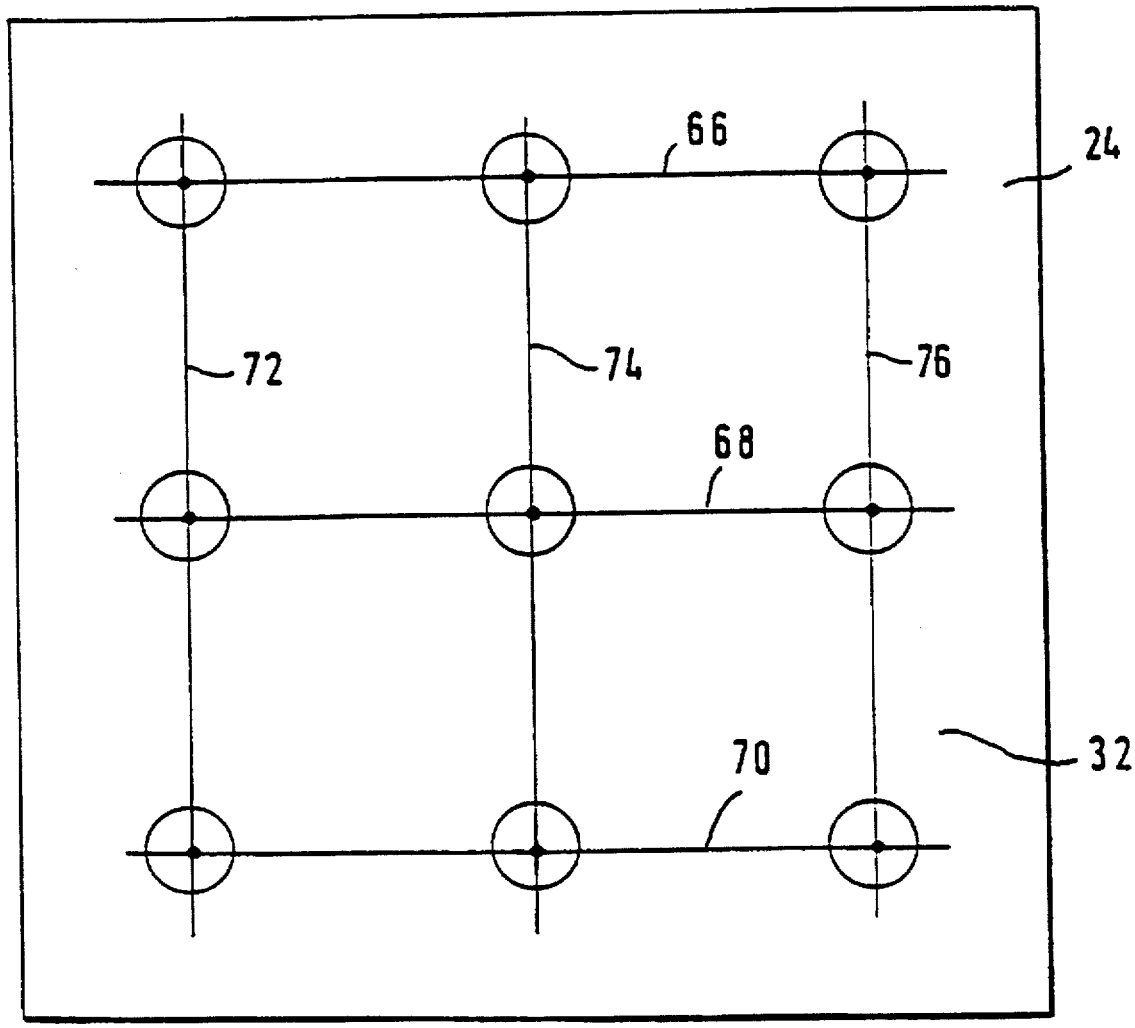
FIG. 3 shows a top view of a matrix in which sensors and secondary lens systems are arranged.

FIG. 2 shows a longitudinal cut through a photogrammetric camera in a second embodiment. The secondary lens systems 18, 20, 22 here comprise several cascaded individual lens systems 18', 18", 18"', 20', 20", 20"', 22', 22", 22"'. In each level of this cascade, an enlarged section of the focal plane lying in the beam path in front of the individual lens system in each case is reproduced on a focal plane lying behind the individual lens system. The individual lens systems 18', 20', 22' thus form enlarged sections of the focal plane 24' on a focal plane 24"; the individual lens systems 18", 20", 22" in turn form enlarged sections of the focal plane 24" on a focal plane 24"', etc. Only the sensors 12, 14, 16 lie in the focal plane 24"'. In this embodiment the individual lens systems 18', 20', 22', 18", 20", 22" and 18"', 20"', 22"' lie in each case on slides 34', 34" and 34"'. High-resolution distance measurement devices 28', 28" and 28"' are allocated in each case to the individual lens systems or slides. The remaining features of the embodiment agree with those depicted in FIG. 1. FIG. 3 shows a top view of a matrix 32 in which sensors and secondary lens systems are arranged. The matrix 32 in this exemplary embodiment includes three rows 66, 68, 70 and three columns 72, 74, 76 with equal distances. The projection centers of the secondary lens systems and the reference points of the sensors lie in the intersecting points of rows 66, 68, 70 and columns 72, 74, 76. In relation to the usable imaging surface of the focal plane 24, the distances of the rows 66, 68, 70 and columns 72, 74, 76 are measured such that by shifting the matrix 32 by half the column and row distance in each case in the positive and negative X and Y coordinate direction, the entire usable imaging surface of the focal plane 24 can be determined.

Figure 4:
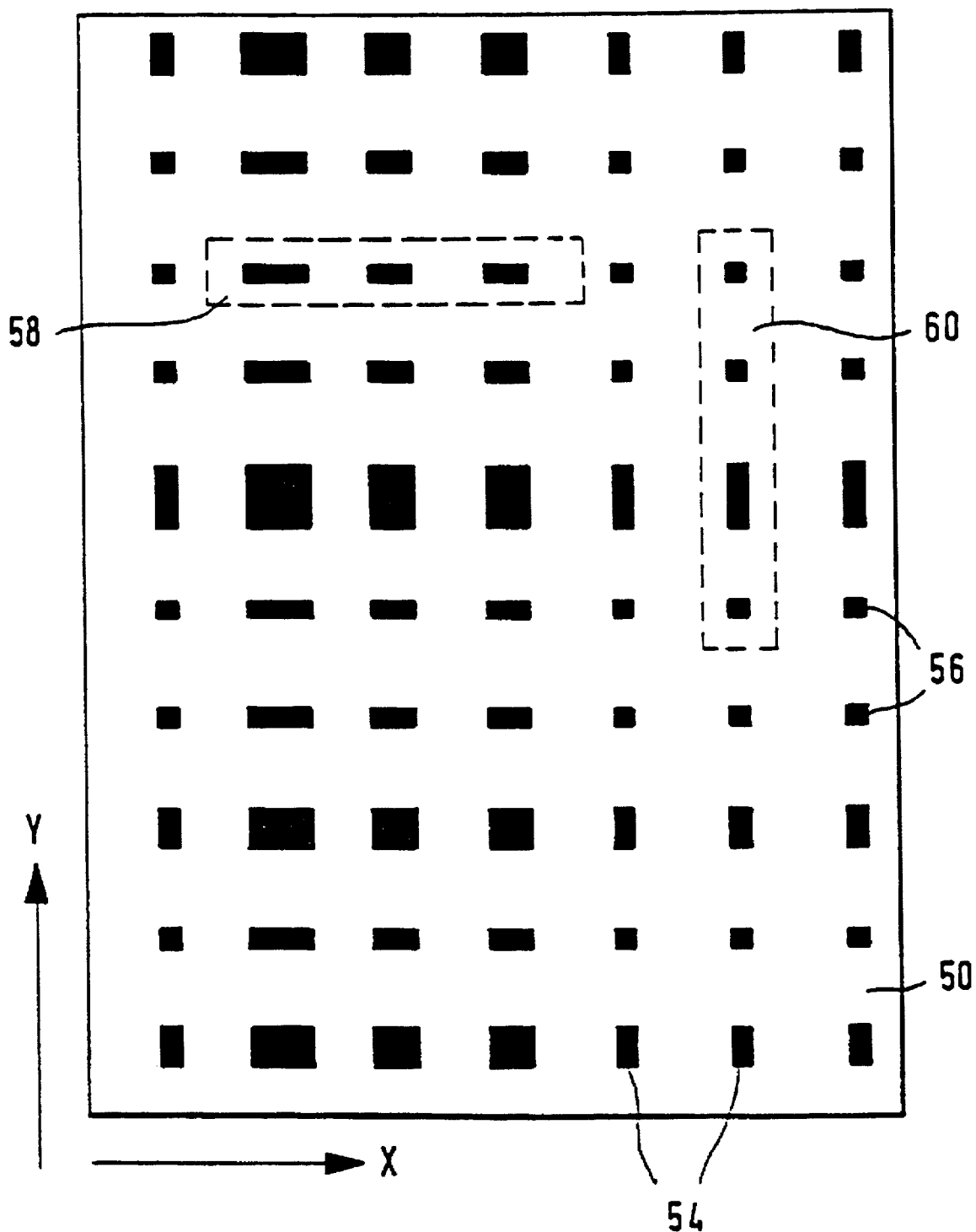
FIG. 4 shows a schematic depiction of a distance measuring device.

FIG. 4 shows a schematic depiction of a distance measurement device. On a positionable surface 50, marks 54, 56 of a constant interval are arranged in two coordinate directions X, Y with an absolute coding. The marks 54, 56 have different marking widths by means of which their coordinates are coded. Code containing the decoding of the marking widths of several marks 54, 56 lying next to one another makes it possible to indicate the absolute coordinates of the marks. The marks do not cross the coordinate direction but rather only the intersecting areas are depicted. Thus a pattern of rectangles with different side lengths result.

Samplers 58, 60 which plot one of the coordinate directions X or Y stand opposite the positionable surface 50.

Figure 5:
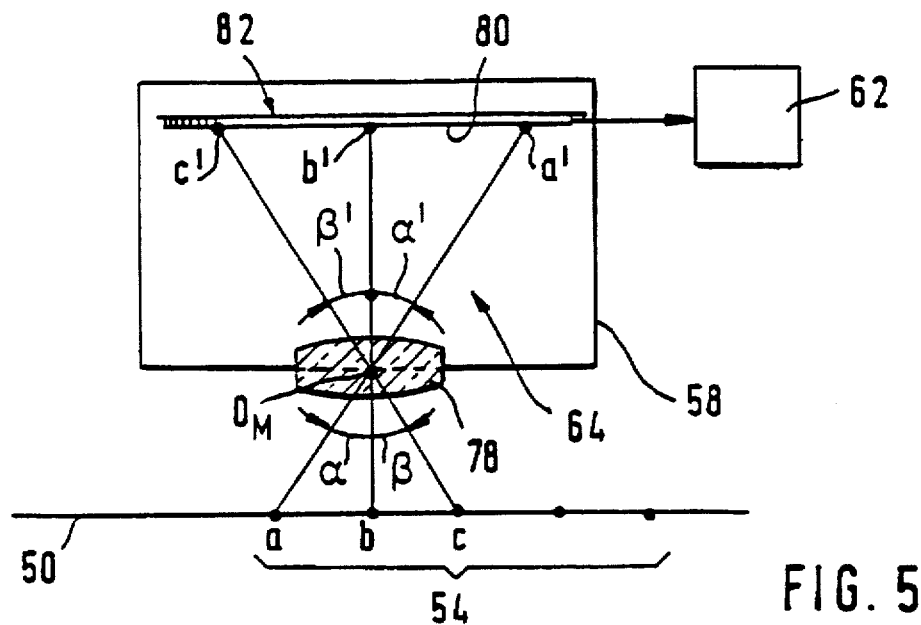
FIG. 5 shows a sampling arrangement of the distance measuring device and FIG. 6 shows a geometric depiction of the projection angle of the sampling arrangement.

FIG. 5 shows a sampling arrangement 48 of the distance measurement device for one coordinate direction. This includes a surface 50 with marks 54, from which individual marks are indicated here with a, b, and c. A sampler 58 is situated over the surface 50 and decodes the length information encoded in the marks 54. With the help of an angle measurement device 64, projection angles which occur between the marks 54 and a sampling location $O_M$ of the sampler 58 are determined.

The sampler 58 is designed as an optical sampler and includes an imaging lens system 78 with a projections surface 80 as well as a distance measurement device 82. For this sampler a sampling location $O_M$ is formed by the projection center of the imaging lens system 78 facing the surface 50. The projection surface 80 is formed by a diode array, i.e. in the form of a CCD line. The number of pixels is selected so that the marks 54 can be resolved in their width and decoded with the help of a processor 62.

The interpolation between the marks 54 is undertaken by means of the angle measurement device 64. As is evident in the drawing, the marks α, β and c, for example, which include the angle α or β to the sampling location $O_M$, are reproduced under angles α' and β' on the points a', b' and c' of the projection surface 80.

There the projection angle is determined via the distance measurement of the projections points a', b' and c' on the projection surface 80 by means of the distance measurement device 82 in each case. If the distance measurement device 82 is, for example, a CCD line, then loading modifications which can be converted from the processor 62 into corresponding angle values β and β are effected at the points at which the marks are reproduced on these lines. From the projection angles α and β, the coordinates of the sampling location $O_M$, which agrees here with the projection center in the imaging lens system 78, can be determined using trigonometric functions.

Figure 6:
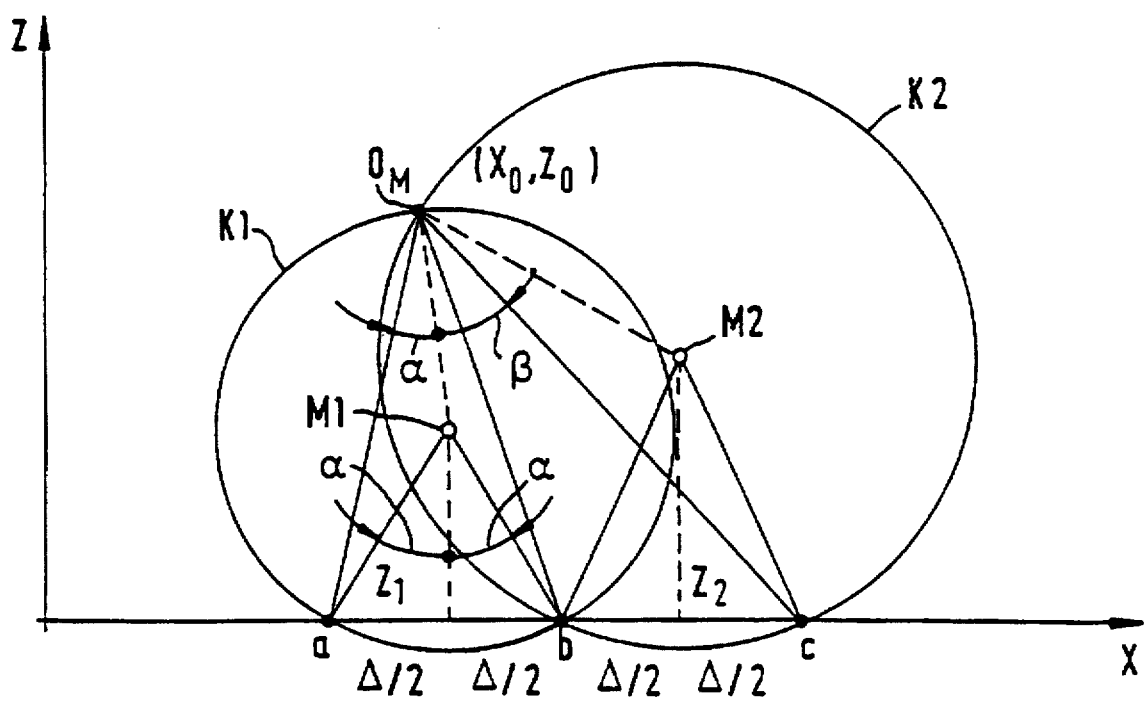

To explain the computational steps, FIG. 6 is referenced, which shows a geometric depiction of the projection angle of the sampling arrangement. From the depiction in accordance with FIG. 5, only marks a, b, c and the sampling location $O_M$ are carried over. In this case, the sampling location $O_M$ is not situated directly over mark b, in order to graphically illustrate that any desired position of the sampling location $O_M$ can be determined.

Between the sampling location $O_M$ and the marks a and b, the projection angle α and between the sampling location $O_M$ and the marks b and c the projection angle β is enclosed. The distances of marks a, b and c amounts to Δ in each case. If one considers the angle α and β at once, there are different points which fill the same projection angles α and β. These points are located on a locus curve which are depicted for the angle α by a circle K1 and for the angle β by a circle K2. If one combines both angles α and β, then there is only one real point at which the requirement is fulfilled. This point is indicated by the intersection of the two locus curves, that is to say circles K1 and K2.

The center point M1 and M2 of circles K1 and K2 can be determined such that the middle vertical line between the marks a and b on one hand and b and c on the other hand are determined and the intersection here with the lines is obtained, which also runs under the projection angle, that is to say α or β, through the marks a and b or b and c. For the distances of the center point M1 and M2 from the scale axis, that is to say the Z coordinate of the center point M1 and M2 yield:

$$Z_1 + \frac{\Delta}{2 * \tan\alpha}$$

and $$Z_2 = \frac{\Delta}{2 * \tan\beta}$$

Through mathematical derivation the following is yielded for:

$$X_o = \frac{\Delta * (Z_1^2 - Z_2^2)}{(Z_1 - Z_2)^2 + \Delta^2}$$

and for:

-continued
$$Z_o = \frac{\Delta^2 * (Z_1 - Z_2)}{(Z_1 - Z_2)^2 + \Delta^2}$$

These equations thus lead to a definitive solution and can be determined with standard processors within a short period of time. Analogous to this, the coordinates for the other coordinate direction are determined also.

What is claimed is:

1. A photogrammetric camera, comprising:
   a focussable primary lens system having a focal plane;
   a high resolution sensor unit which is movable across an optical axis of said primary lens system, wherein said high resolution sensor unit includes a secondary lens system which reproduces at least one enlarged section of the focal plane of said primary lens system on at least one high resolution sensor allocated to said secondary lens unit; and
   a distance measuring unit including at least one high resolution distance measurement device which detects the distance between at least one projection center of said secondary lens system and a reference point of said at least one high resolution sensor, and the distance between the projection center and said optical axis of said primary lens system.

2. A photogrammetric camera as claimed in claim 1, wherein said at least one high resolution sensor includes a multiplicity of high resolution sensors arranged with an allocated multiplicity of secondary lens systems in a matrix having constant column distances and constant row distances.

3. A photogrammetric camera as claimed in claim 1, wherein said at least one secondary lens system include a multiplicity of cascaded individual lens systems.

4. A photogrammetric camera as claimed in claim 1, wherein said at least one high resolution sensor and said at least one secondary lens system are arranged on a common slide and can be moved together.

5. A photogrammetric camera as claimed in claim 1, wherein said at least one high resolution sensor and said at least one secondary lens system are arranged on separate slides and can be moved independently from one another.

6. A photogrammetric camera as claimed in claim 1, wherein said at least one high resolution sensor is a CCD line.

7. A photogrammetric camera as claimed in claim 1, wherein said at least one high resolution sensor is a CCD surface.

8. A photogrammetric camera as claimed in claim 1, further comprising high resolution spatial position measurement devices are allocated to the primary lens system.

9. A photogrammetric camera as claimed in claim 8, wherein said spacial position measurement devices include at least three high resolution distance measurement devices arranged evenly on a mantle surface lying coaxially to the optical axis of the primary lens system.

10. A photogrammetric camera as claimed in claim 1, wherein the high resolution distance measurement devices indicate position for determining the position of a sampling arrangement relative to a positionable surface with positionable surfaces on said at least one secondary lens system, the high resolution sensors and the primary lens system and sampling arrangements on a common housing or the reverse, whereby on the positionable surface marks of constant interval with an absolute coding are arranged in two coordinate directions and samplers stand opposite these marks, whereby the samplers are connected to a coordinate processor and whereby the samplers include an angle measurement device in each case, by means of which projection angle between a reference point of the angle measurement device of the sampler in each case and at least three adjacently arranged marks are determined and the processor is controlled such that it calculates the coordinates of the reference point in each case according to trigonometric functions.

11. A photogrammetric camera as claimed in claim 10, wherein the coordinate processor processes the following functions or equations as trigonometric functions:

$$X_o; Y_o = \frac{\Delta * (Z_1^2 - Z_2^2)}{(Z_1 - Z_2)^2 + \Delta^2}$$

$$Z_o = \frac{\Delta^2 * (Z_1 + Z_2)}{(Z_1 - Z_2)^2 + \Delta^2}$$

$$Z_1 + \frac{\Delta}{2 * \tan\alpha}$$

$$Z_2 = \frac{\Delta}{2 * \tan\beta}$$

where $\alpha$ refers to the projection angle between an associated reference point as wall as a first and a second adjacent mark, $\beta$ refers to the projection angle between the associated reference point and a second as well as a third adjacent mark, $\Delta$ is the distance between two adjacent marks and $X_o, Y_o, Z_o$ represent the coordinates of the associated reference points relative to the positionable surface.

12. A photogrammetric camera as claimed in claim 2, wherein said at least one secondary lens system includes several cascaded individual lens systems.

13. A photogrammetric camera as claimed in claim 2, wherein said at least one high resolution sensor and said at least one secondary lens system are arranged on a common slide and can be moved together.

14. A photogrammetric camera as claimed in claim 3, wherein said at least one high resolution sensor and said at least one secondary lens system are arranged on a common slide and can be moved together.

15. A photogrammetric camera as claimed in claim 11, wherein said at least one high resolution sensor and said at least one secondary lens system are arranged on a common slide and can be moved together.

16. A photogrammetric camera as claimed in claim 2, wherein said at least one high resolution sensor and said at least one secondary lens system are arranged on separate slides and can be moved independently from one another.

17. A photogrammetric camera as claimed in claim 3, wherein said at least one high resolution sensor and said at least one secondary lens system are arranged on separate slides and can be moved independently from one another.

18. A photogrammetric camera as claimed in claim 11, wherein said at least one high resolution sensor and said at least one secondary lens system are arranged on separate slides and can be moved independently from one another.

19. A photogrammetric camera as claimed in claim 14, wherein said at least one high resolution sensor and said at least one secondary lens system are arranged on separate slides and can be moved independently from one another.

20. A photogrammetric camera as claimed in claim 2, wherein said at least one high resolution sensor is a CCD line.

21. A photogrammetric camera as claimed in claim 2, wherein said at least one high resolution sensor is a CCD surface.

22. A photogrammetric camera, comprising:

a focussable primary lens system having a focal plane;

a sensor unit which is movable across an optical axis of said primary lens system, wherein said sensor unit includes a secondary lens system which reproduces at least one enlarged section of the focal plane of said primary lens system on at least one sensor allocated to said secondary lens unit; and a distance measuring unit including at least one distance measurement device which detects the distance between at least one projection center of said secondary lens system and a reference point of said at least one sensor, and the distance between the projection center and said optical axis of said primary lens system.

* * * * *